(12) United States Patent
Bando

(10) Patent No.: US 6,461,223 B1
(45) Date of Patent: Oct. 8, 2002

(54) SHEET GLASS WORKING MACHINE

(75) Inventor: Kazuaki Bando, Tokushima (JP)

(73) Assignee: Bando Kiko Co., Ltd., Tokushima (JP)

( * ) Notice: Subject to any disclaimer, the term of this patent is extended or adjusted under 35 U.S.C. 154(b) by 0 days.

(21) Appl. No.: 09/673,923

(22) PCT Filed: Feb. 23, 2000

(86) PCT No.: PCT/JP00/01027

§ 371 (c)(1),
(2), (4) Date: Nov. 9, 2000

(87) PCT Pub. No.: WO00/50348

PCT Pub. Date: Aug. 31, 2000

(30) Foreign Application Priority Data

Feb. 25, 1999 (JP) .................................. 11-049078

(51) Int. Cl.[7] .............................................. B24B 51/00
(52) U.S. Cl. .............................. 451/12; 451/44; 451/70
(58) Field of Search ......................... 451/12, 44, 5, 451/67, 70; 125/23.01; 225/96.5

(56) References Cited

U.S. PATENT DOCUMENTS

| | | | |
|---|---|---|---|
| 4,660,327 | * | 4/1987 | Bando ..................... 198/626.6 |
| 4,698,088 | * | 10/1987 | Bando ....................... 225/93.5 |
| 4,843,764 | * | 7/1989 | Bando ......................... 451/260 |
| 5,040,342 | * | 8/1991 | McGuire et al. ............... 451/38 |
| 5,221,034 | * | 6/1993 | Bando ....................... 225/103 |
| 5,396,736 | * | 3/1995 | Bando ............................. 451/5 |
| 5,415,581 | * | 5/1995 | Bando ..................... 125/23.01 |
| 5,810,642 | * | 9/1998 | Bando ....................... 225/96.5 |

FOREIGN PATENT DOCUMENTS

| | | | | |
|---|---|---|---|---|
| EP | 0 217 658 A1 | 4/1987 | | |
| EP | 0217658 | 4/1987 | | |
| EP | 0 372 832 A1 | 6/1990 | | |
| EP | 0550408 A1 | * | 7/1993 | ........... C03B/33/03 |
| JP | 63156029 A | * | 6/1988 | ........... B23P/23/02 |

* cited by examiner

Primary Examiner—Timothy V. Eley
Assistant Examiner—David B. Thomas
(74) Attorney, Agent, or Firm—Nixon & Vanderhye P.C.

(57) ABSTRACT

A glass plate working machine comprises a cutting unit(1) for forming a cutting line on an unshaped glass plate(22) to break the unshaped glass plate(22), a grinding unit(2) for grinding an edge of the glass plate broken along the cutting line, a glass plate conveyer unit(4) for conveying the glass plate sequentially through the cutting unit(1) and the grinding unit(2), and control mean(CNT), connected to the cutting unit(1) and the grinding unit(2) for controlling the cutting unit(1) and the grinding unit(2), respectively.

7 Claims, 16 Drawing Sheets

SHEET GLASS WORKING MACHINE

TECHNICAL FIELD

The present invention relates to a glass plate working machine suitable for forming a window glass for an automobile, etc., by breaking an unshaped glass plate.

BACKGROUND ART

A glass plate working machine is known, wherein a table in a cutting unit on which an unshaped glass plate is placed and a table in a grinding unit on which the broken glass plate is placed are adapted to be moved by one electric motor in one direction in a horizontal plane, a cutting head in the cutting unit for forming a cutting line on the unshaped glass plate and a grinding head in the grinding unit for grinding an edge of the broken glass plate are adapted to be moved by one electric motor as well in another direction perpendicular to one direction in a horizontal plane.

In such a glass plate working machine, it is quite easy and preferable that both tables are each moved mutually synchronously and that the cutting head and the grinding head are each moved mutually synchronously, since the source of the operation to move them is one electric motor. However, the transmitting mechanism for informing the rotation of one electric motor to each of the tables and the transmitting mechanism for informing the rotation of one electric motor to the cutting head and the grinding head are complicated, the distance of the information route is long, and further, it is difficult that the glass plate working machine is arranged to include the perfectly same transmitting mechanisms with respect to backlash or the like.

Accordingly, in the above mentioned glass plate working machine, it is not always possible to move accurately synchronously each of both tables and each of the cutting head and the grinding head mutually because of the difference of the length of the transmitting mechanism, the difference of the backlash of the transmitting mechanism or the like.

The present invention has been made in view of the above problems. It is an object of the present invention to provide a glass plate working machine which is capable of moving the table in the cutting unit on which an unshaped glass plate is placed and the table in the grinding unit on which the broken glass plate is placed accurately synchronously.

It is another object of the present invention to provide a glass plate working machine which is capable of moving the cutting head in the cutting unit for forming a cutting line on the unshaped glass plate and the grinding head in the grinding unit for grinding the edge of the broken glass plate accurately synchronously.

DISCLOSURE OF THE INVENTION

The glass plate working machine according to the first aspect of the present invention comprises a cutting unit for forming a cutting line on an. unshaped glass plate to break the unshaped glass plate, a grinding unit for grinding an edge of the glass plate broken along the cutting line, a glass plate conveyer unit for conveying the glass plate sequentially through the cutting unit and the grinding unit, and control means connected to the cutting unit and the grinding unit for controlling the cutting unit and the grinding unit, respectively, the cutting unit including a table of the cutting unit on which the unshaped glass plate is placed, and an electric motor for moving the table of the cutting unit in one direction, the grinding unit including a table of the grinding unit on which the broken glass plate is placed, and an electric motor disposed separately from the electric motor of the cutting unit, for moving the table of the cutting unit in one direction for moving the table of the grinding unit in one direction, the electric motor of the cutting unit and the electric motor of the grinding unit being adapted to be operated synchronously by the control means to move the table of the cutting unit and the table of the grinding unit concurrently in one direction.

Since the glass plate working machine according to the first aspect of the present invention comprises the electric motor for moving the table of the cutting unit in one direction and the electric motor for moving the table of the grinding unit in one direction, and is arranged such that both of the electric motors are operated synchronously by the control means, the distance between respective electric motor and the table of the cutting unit or the table of the grinding unit can be made shorter, simple transmitting mechanism can be adopted, the difference of the backlash or the like of the transmitting mechanism can be minimized, and further, the deviation of the position between the table of the cutting unit and the table of the grinding unit based on the difference of the backlash or the like of the transmitting mechanism can be adjusted individually by the controlling means. Therefore, the table in the cutting unit on which an unshaped glass plate is placed and the table in the grinding unit on which the broken glass plate is placed can be moved accurately synchronously.

The glass plate working machine according to the second aspect of the present invention is arranged such that the table of the cutting unit and the table of the grinding unit are connected to each other through an intermediate connecting plate in the glass plate working machine according to the first aspect.

In the glass plate working machine according to the second aspect, since the table of the cutting unit and the table of the grinding unit are connected to each other through the intermediate connecting plate, the deviation of the position between the table of the cutting unit and the table of the grinding unit can be reduced furthermore, therefore, the table in the cutting unit on which an unshaped glass plate is placed and the table in the grinding unit on which the broken glass plate is placed can be moved more accurately synchronously.

The glass plate working machine according to the third aspect of the present invention comprises a breaking unit provided between the cutting unit and the grinding unit for breaking the unshaped glass plate along the cutting line, the control means being connected to the breaking unit such that while the cutting unit and the grinding unit are in motion, the breaking unit performs an operation concurrently, in the glass plate working machine according to the first or second aspect.

In the glass plate working machine according to the third aspect, since the breaking unit performs an operation concurrently while the cutting unit and the grinding unit are in motion, time for working the glass plate is reduced considerably.

The glass plate working machine according to the forth aspect of the present invention comprises a breaking unit provided between the cutting unit and the grinding unit for breaking the unshaped glass plate along the cutting line, the control means being connected to the breaking unit such that while the cutting unit and the grinding unit are in motion, the breaking unit performs an operation concurrently, the table of the cutting unit and the table of the grinding unit being connected to each other through an intermediate connecting plate disposed across the breaking unit, in the glass plate working machine according to the first aspect.

In the glass plate working machine according to the forth aspect, since the breaking unit performs an operation concurrently while the cutting unit and the grinding unit are in motion, time for working the glass plate is reduced considerably, and further, since the table of the cutting unit and the table of the grinding unit are connected to each other through the intermediate connecting plate provided across the breaking unit, the deviation of the position between the table of the cutting unit and the table of the grinding unit can be reduced furthermore. Therefore, the table in the cutting unit on which an unshaped glass plate is placed and the table in the grinding unit on which the broken glass plate is placed can be moved more accurately synchronously.

The glass plate working machine according to the fifth aspect of the present invention is arranged such that the cutting unit includes a cutting head for forming the cutting line on the unshaped glass plate, the grinding unit includes a grinding head for grinding the edge of the broken glass plate, the cutting head and the grinding head are adapted to be moved concurrently in another direction perpendicular to one direction, the control means controlling the concurrent movement of the cutting head and the grinding head, in the glass plate working machine according to any one of the first to forth aspects.

The glass plate working machine according to the sixth aspect of the present invention is arranged such that the cutting unit includes a cutting head for forming the cutting line on the unshaped glass plate, and an electric motor for moving the cutting head in another direction perpendicular to one direction, the grinding unit including a grinding head for grinding the edge of the broken glass plate, and an electric motor disposed separately from the electric motor of the cutting unit for moving the cutting head in another direction for moving the grinding head in another direction, the electric motor of the cutting unit for moving the cutting head in another direction and the electric motor of the grinding unit for moving the grinding head in another direction being adapted to be operated synchronously by the control means to move the cutting head and the grinding head concurrently in another direction, in the glass plate working machine according to. any one of the first to forth aspects.

Since the glass plate working machine according to the sixth aspect comprises the electric motor for moving the cutting head in another direction and the electric motor for moving the grinding head in another direction and is arranged such that both of the electric motors are operated synchronously by the control means, the distance between respective electric motor and the cutting head or the grinding head can be made shorter, simple transmitting mechanism can be adopted, the difference of the backlash or the like of the transmitting mechanism can be minimized, and further, the deviation of the position between the cutting head and the grinding head based on the difference of the backlash or the like of the transmitting mechanism can be adjusted individually by the controlling means. Therefore, the cutting head in the cutting unit for forming a cutting line on an unshaped glass plate and the grinding head in the grinding unit for grinding an edge of the broken glass plate can be moved accurately synchronously.

The glass plate working machine according to the seventh aspect of the present invention comprises a cutting unit for forming a cutting line on an unshaped glass plate to break the unshaped glass plate, a grinding unit for grinding an edge of the glass plate broken along the cutting line, a glass plate conveyer unit for conveying the glass plate sequentially through the cutting unit and the grinding unit, and control means connected to the cutting unit and the grinding unit for controlling the cutting unit and the grinding unit, respectively, the cutting unit including a cutting head for forming the cutting line on the unshaped glass plate, and an electric motor for moving the cutting head in one direction, the grinding unit including a grinding head for grinding the edge of the broken glass plate, and an electric motor disposed separately from the electric motor of the cutting unit for moving the cutting head in one direction for moving the grinding head in one direction, the electric motor of the cutting unit for moving the cutting head in one direction and the electric motor of the grinding unit for moving the grinding head in one direction being adapted to be operated synchronously by the control means to move the cutting head and the grinding head concurrently in one direction.

The glass plate working machine according to the seventh aspect takes same effect as the glass plate working machine according to the sixth aspect.

The present invention is applicable to a glass plate working machine which produces an automobile window glass, for example, glass for side windows, front windows, rear windows, rear quarter windows and the like on a flexible manufacturing basis. However, the present invention is applicable to a glass plate working machine for producing not only such an automobile glass but also a table top glass put on a table and other glass plates having a deformed shape, etc.

A glass plate working machine according to the present invention may be arranged such that a glass plate is worked and conveyed in accordance with a numerical control system. A glass plate working machine according to the present invention may be arranged such that cutting and grinding of glass plates are performed concurrently under the control of a numerical control device and glass plates are sequentially fed under the control of the numerical control device. A glass plate working machine according to the present invention may be arranged such that only the sole machine performs cutting, breaking and grinding operations on an unshaped glass plate under the control of a numerical control device in a line conveyer system. Namely, the glass plate working machine according to the present invention may be arranged such that a glass plate is ground in the grinding stage while a cutting line is being formed by a cutter on another glass plate in the cutting stage.

One of glass plate working machines according to the present invention includes a cutting unit for forming a cutting line on an unshaped glass plate in order to cut the unshaped glass plate in accordance with numerical information, a grinding unit for grinding a cut edge of the glass plate, a breaking unit provided between the cutting unit and the grinding unit for breaking the glass plate with the cutting line formed in the cutting unit along the cutting line, and a glass plate conveying unit for sequentially conveying the glass plate to the cutting unit, breaking unit, grinding unit and, when required, a discharging unit.

The glass plate working machine according to the present invention may be arranged such that the motions of the cutting unit and the grinding unit are interlocked, to perform the cutting and grinding operations in parallel and to simultaneously break a glass plate to be transferred to the grinding unit in the next operation stage, i.e. in the next cycle in the breaking unit.

The present invention and embodiments of the present invention will now be described in more detail with reference to the drawings.

It should be noted that the present invention is not limited to these embodiments.

EMBODIMENT

Figure 1:
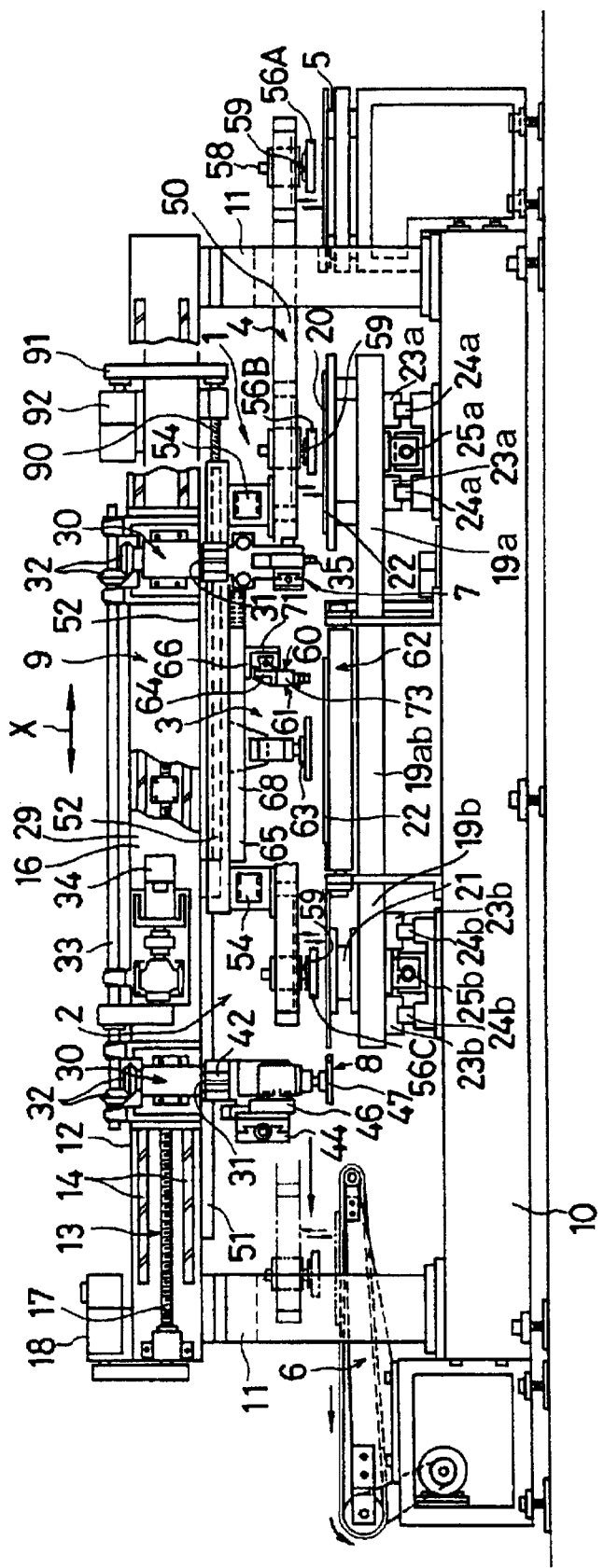
FIG. 1 is a front view of an illustrative embodiment of a glass plate working machine according to the present invention.
Figure 2:
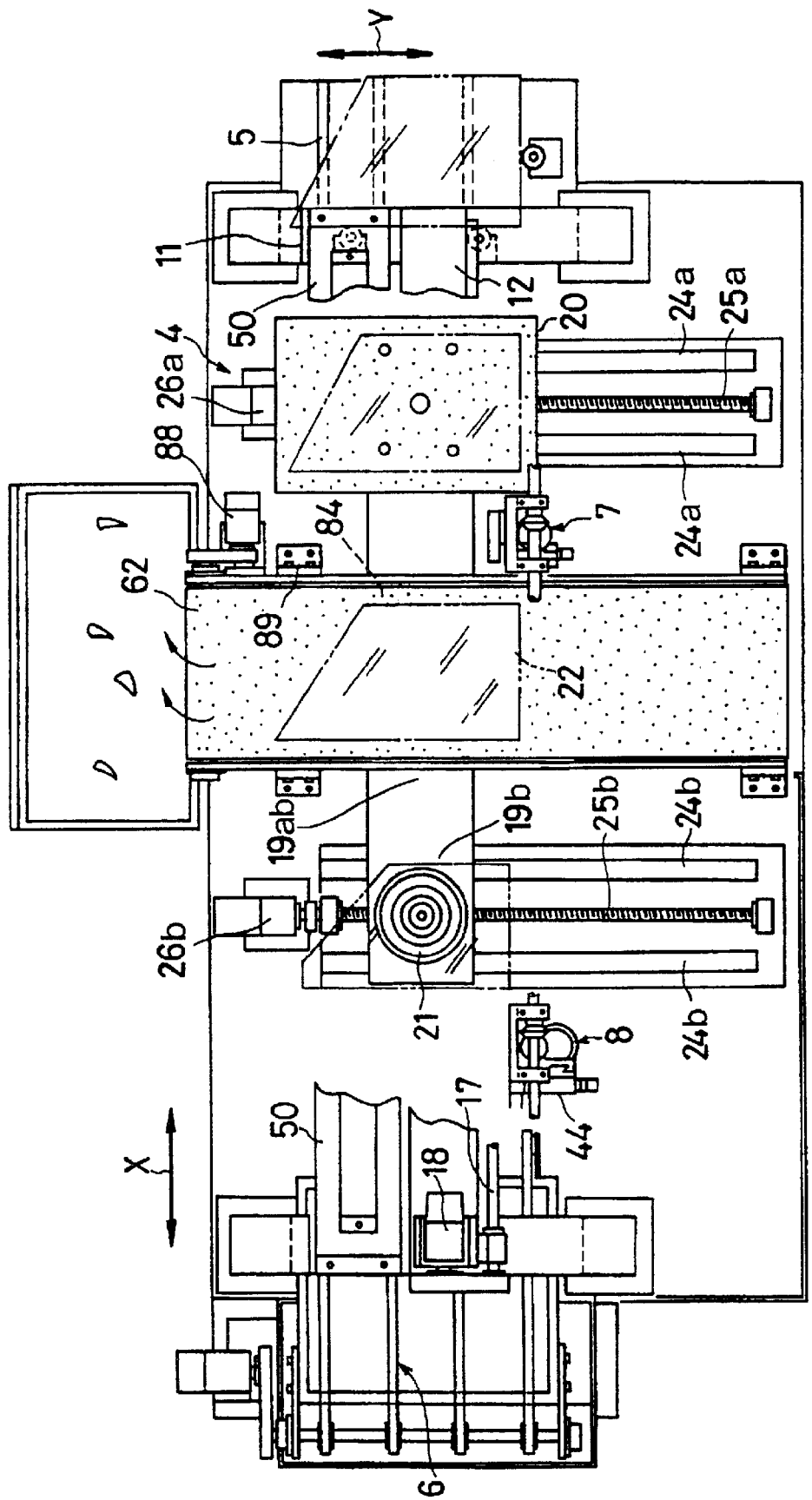
FIG. 2 is a cut-away plan view of the working machine of FIG. 1.

Referring to FIGS. 1–16, a glass plate working machine according to the present invention includes a cutting unit 1 shown in the right-hand portion of FIG. 1, a grinding unit 2 shown in the left-hand portion of FIG. 1, a breaking unit 3 at the center of FIG. 1 and a glass plate conveying unit 4 behind those elements. Further, insertion table 5 is disposed on the right side of cutting unit 1 while take-out conveyer 6 is disposed on the left side of grinding unit 2. Cutting head 7 of cutting unit 1 and grinding head 8 of ;grinding unit 2 are connected to a common driving means 9 in X direction such that they perform the same parallel motion in X direction in the X-Y orthogonal plane coordinate system under control of the numerically controlled common driving means 9 in X direction. Namely, cutting head 7 and grinding head 8 shares the X axis of the orthogonal coordinate system. In the glass plate working machine, cutting head 7 and grinding head 8 are adapted to move in the X axis direction while work tables 19a and 19b which holds a glass plate are adapted to move synchronously to each other in the Y axis direction as shown in FIG. 2.

Figure 3:
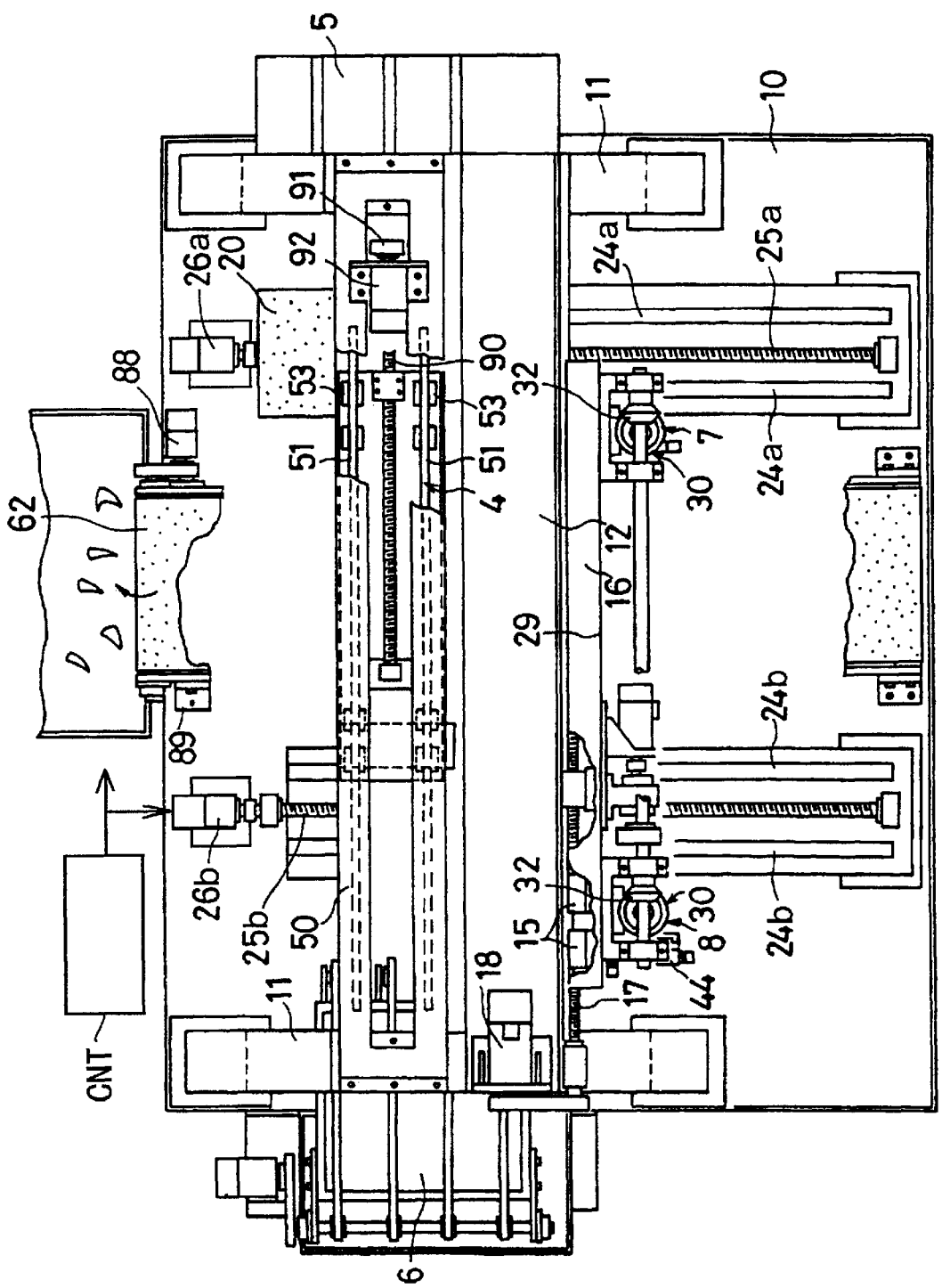
FIG. 3 is a cut-away plan view of the working machine of FIG. 1.

Mount 12 is provided through the gate-type frame base 11 upstanding at each end of base 10. Slide rail units 13 are provided in front of the mount 12 so as to extend parallel to the X axis direction. Slide rail unit 13 includes parallel rails 14 provided on mount 12 so as to extend parallel to the X direction and a plurality of slides 15 which move on rails 14 as shown in FIG. 3, and to which a linear movement base 16 is fixed. The linear movement base 16 is provided with cutting head 7 and grinding head 8. Therefore, cutting head 7 and grinding head 8 are guided movably in the X axis direction in conjunction with the movement of linear movement base 16 of slide unit 13.

The drive of linear movement base 16 in the X axis direction is made by feed screw 17 provided between the pair of slide rails 14 and X axis control motor 18 connected to feed screw 17. Driving means 9 includes rail units 13, linear movement base 16 and motor 18, as mentioned above.

Work tables 19a and 19b are provided respectively below cutting head 7 and grinding head 8 so as to be moved in the Y axis direction synchronously to each other. Cutting table 20 is disposed on work table 19a corresponding to cutting head 7 and sucker 21 is disposed on work table 19b corresponding to grinding head 8, respectively. Cutting table 20 has an upper flat surface, which is wider than an unshaped glass plate 22 to be cut, and is covered with a sheet on which the glass plate 22 is supported so as not to impair the unshaped glass plate 22. Sucker 21 as table of the grinding unit is connected through a piping valve to a vacuum pump (not shown) so as to vacuum suck the glass plate.

Work table 19a has slides 23, each engaging a corresponding slide rail 24a. By such engagement, table 19a is supported slidably in the Y direction on slide rails 24a. Since slide rails 24a extend parallel to the Y axis, direction on the base 10, table 19a is guided movably in the Y axis direction by rails 24a.

As shown in FIGS. 2 and 3, the drive of work table 19a in the Y axis direction is made by feed screws 25a provided along slide rails 24a and a Y axis control motor 26a connected to feed screws 25a to rotate feed screws 25a.

Work table 19b has slides 23b, each engaging a corresponding slide rail 24b. By such engagement, table 19b is supported slidably in the Y direction on slide rails 24b. Since slide rails 24b extend parallel to the Y axis direction on the base 10, table 19b is guided movably in the Y axis direction by rails 24b.

As shown in FIGS. 2 and 3, the drive of work table 19b in the Y axis direction is made by feed screws 25b provided along slide rails 24b and a Y axis control motor 26b connected to feed screws 25b to rotate feed screws 25b.

Y axis control motor 26a and Y axis control motor 26b provided individually are adapted to be operated synchronously by the numerical control device CNT as control means such that work table 19a and work table 19b are moved synchronously in Y direction.

In this embodiment, work table 19a and work table 19b are connected to each other by intermediate connecting plate 19ab provided across the breaking unit 3, and are also arranged to be moved synchronously to each other in Y direction by the intermediate connecting plate 19ab, however, they may be arranged to be moved synchronously to each other in Y direction alternatively only by the synchronous operation of the Y axis control motor 26a and Y axis control motor 26b mentioned above without the intermediate connecting plate 19ab.

As described above, the cutting unit 1 includes the table 20 as a table of the cutting unit on which a glass plate 22 as an unshaped glass plate is placed and the electric motor 26a for moving the table 20 in one direction, namely, in Y direction, the grinding unit 2 includes the sucker 21 as a table of the grinding unit on which the broken glass plate 22 is placed and the electric motor 26b provided separately from the electric motor 26a of the cutting unit 1 for moving the table 20 in Y direction for moving the sucker 21 in Y direction, the electric motor 26a of the cutting unit 1 and the electric motor 26b of the grinding unit 2 are adapted to be operated synchronously by the control device CNT to move the table 20 and the sucker 21 concurrently in Y direction, and the table 20 and the sucker 21 are connected to each other through an intermediate connecting plate 19ab.

Accordingly, in the glass plate working machine of the present embodiment, simple. transmitting mechanism can be adopted by shortening the distance of information between the electric motors 26a and 26b, and the table 20 and the sucker 21, respectively, relating to the rotation of the electric motors 26a and 26b, respectively, in addition to minimize the difference of the backlash or the like, of the transmitting mechanism, and moreover, to adjust the deviation of the position between table 20 and sucker 21 relating to Y direction, based on the difference of the backlash or the like, of the transmitting mechanism, separately by the control device CNT. Therefore, the table 20 of the cutting unit 1 on which the glass plate 22 is placed and the sucker 21 of the grinding unit 2 on which the broken glass plate 22 is placed can be moved in Y direction accurately synchronously.

Bearing units 30 each corresponding to each of sucker 21 and cutting table 20 are disposed on the front 29 of linear movement base 16 movable in the X axis direction. Each bearing unit 30 has shafts 31 supported by bearings. Shafts 31 are disposed along a vertical axis perpendicular to the X-Y plane coordinate system, and the cutting head 7 and the grinding head 8 are attached to those corresponding shafts 31.

By rotation of shafts 31, cutting head 7 and grinding head 8 are rotated and controlled around the vertical axis normal to the X-Y coordinate axes. Rotation of cutting head 7 and grinding head 8 is made by bevel gears 32 attached to respective shafts 31 of bearing units 30, line shaft 33 which is provided with the bevel gears 32 at each end thereof, and Z axis control motor 34 which rotates line shaft 33.

The linear movement base 16, feed screw 17 and the line shaft 33 may be divided into two parts on right and left in FIG. 1, one divided linear movement base may be arranged so as to be moved in X direction by X direction moving means which includes the motor 18, another divided linear movement base may be arranged so as to be moved in X direction synchronously with the movement of the one divided linear movement base, by another X direction moving means which includes another motor (not shown) provided to the mount 12 in the same way as the motor 18, in addition, the grinding head 8 may be arranged so as to be provided to the one divided linear movement base, the cutting head 7 may be provided to the another divided linear movement base, and, as mentioned above, the grinding head 8 may be arranged so as to be rotated around the vertical axis normal to the X-Y coordinate axes by Z axis control motor 34 provided to the one divided linear movement base, on the other hand, the cutting head 7 may be arranged so as to be rotated around the vertical axis normal to the X-Y coordinate axes by Z axis control motor (not shown) which is equal to the Z axis control motor 34, provided to the another divided linear movement base, synchronously with the rotation of the grinding head 8.

Namely, in the glass plate working machine of this embodiment, the cutting unit 1 may be constructed comprising the cutting head 7 and the electric motor for moving the cutting head 7 in X direction, the grinding unit 2 may be constructed comprising the grinding head 8 and the electric motor 34 provided separately from the electric motor of the cutting unit 1 for moving the cutting head 7 in X direction for moving the grinding head 8 in X direction, and the electric motor of the cutting unit 1 for moving cutting head 7 in X direction and the electric motor 34 of the grinding unit 2 for moving the grinding head 8 in X direction may be arranged so as to be operated synchronously by the control device CNT, so as to move the cutting head 7 and the grinding head 8 concurrently in X direction.

By such constructions of the glass plate working machine, the cutting head 7 and the grinding head 8 can be moved in Y direction accurately synchronously, in the same way as the table 20 and the sucker 21. And concerning the rotation of the cutting head 7 and the grinding head 8, the construction may be the same way.

Figure 11:
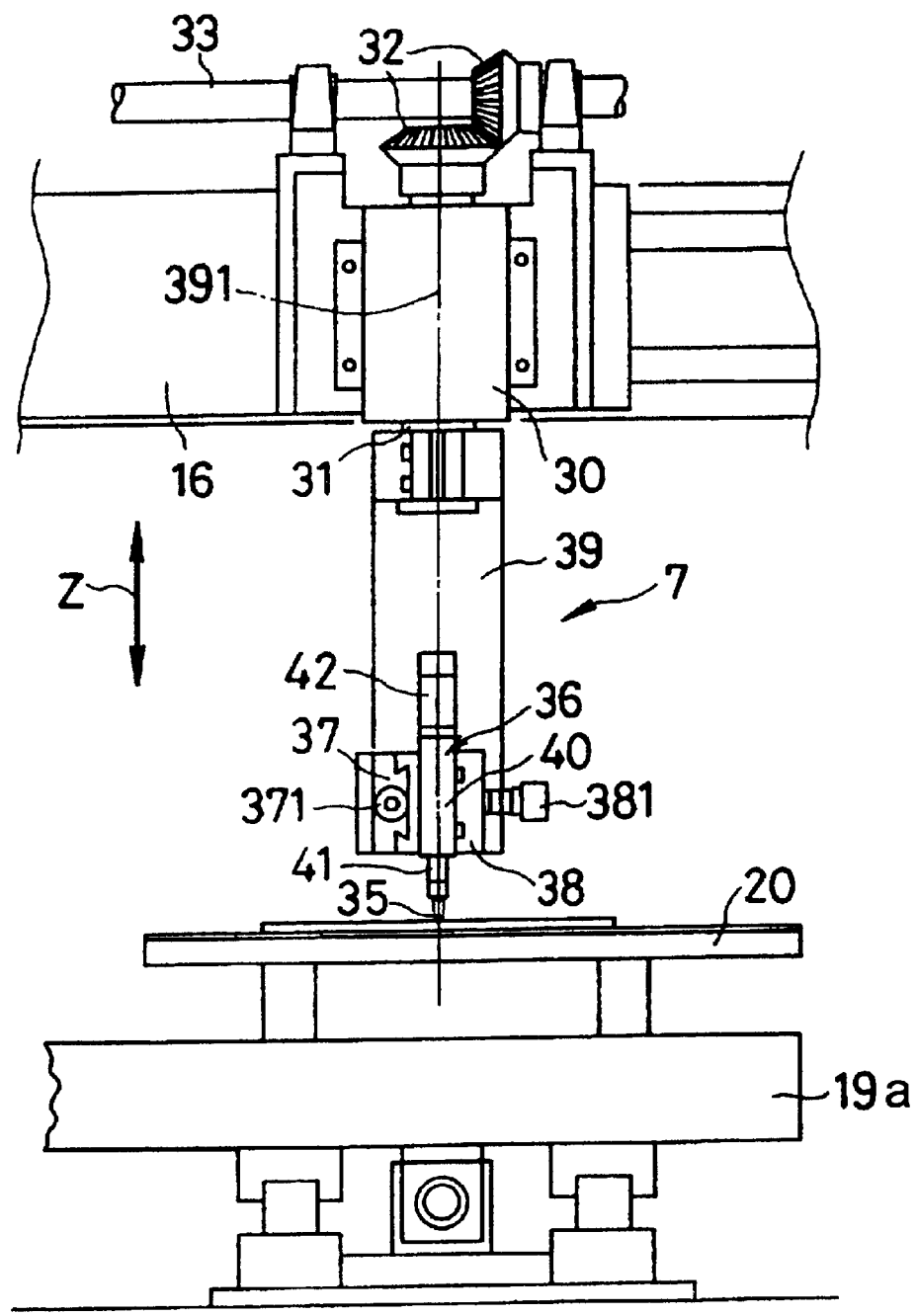
FIG. 11 is a front view of a cutting head of the working machine of FIG. 1.
Figure 12:
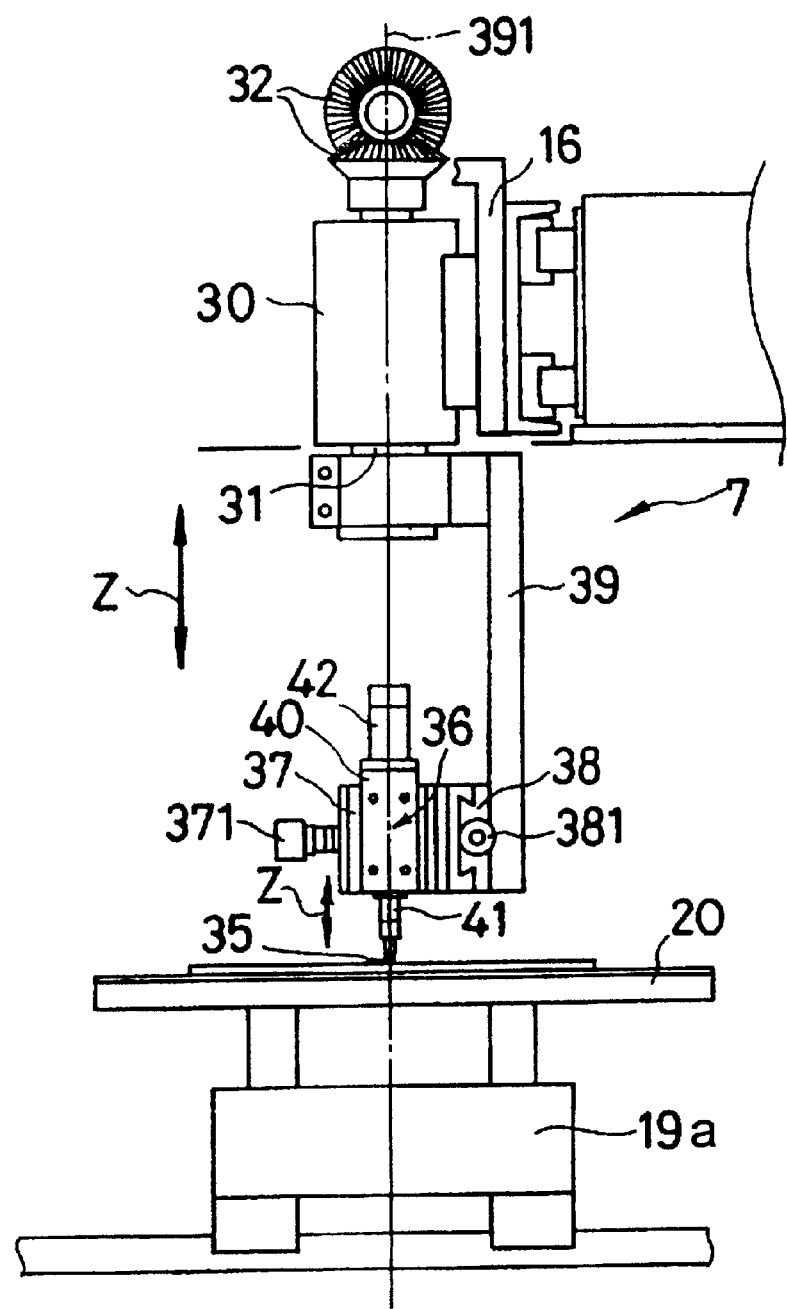
FIG. 12 is a side view of a cutting head of the working machine of FIG. 1.

As shown in FIGS. 11 and 12, cutting head 7 includes cutter body 36 with cutter wheel 35, setting slide 37 and cross slide 38 which adjust the set position of cutter body 36 in the two directions orthogonal to each other in a horizontal plane, respectively, and frame 39 to which setting slide 37 is attached. Cutting head 7 is attached to shaft 31 of bearing unit 30, at an upper portion of frame 39.

The position of setting slide 37 is adjusted slidably in a predetermined direction by screw 371. The position of cross slide 38 is adjusted by screw 381 in another direction intersecting with the former predetermined direction.

Cutter body 36 includes body 40 attached to setting slide 37, piston rod 41 held movably vertically, for example, through a slide bearing, to body 40, and air cylinder 42 which vertically moves piston rod 41 attached to body 40, a cutter wheel 35 being attached to an end of piston rod 41. When a glass plate is to be cut, piston rod 41 moves vertically in the Z direction and lowers to apply a cutting pressure to cutter wheel 35 and hence to the glass plate on cutter wheel 35.

The position of cutter wheel 35 can be adjusted to the position of the rotational axis of cutting head 7, namely, the position of the axis 391 of shaft 31 of bearing unit 30 by setting slide 37 and cross slide 38, namely, rotating respective adjusting screws 371 and 381. The position of cutter wheel 35 can deviate from the position of axis 391, so that fine adjustment of the locus of cutting on glass plate 22 by wheel 35 is made. Thus, the locus of cutting is either enlarged or reduced. Of course, cutter wheel 35 is angularly controlled under the control of rotation of shaft 31 such that its cutting direction, namely, moving direction is always tangential to the cutting line.

Figure 9:
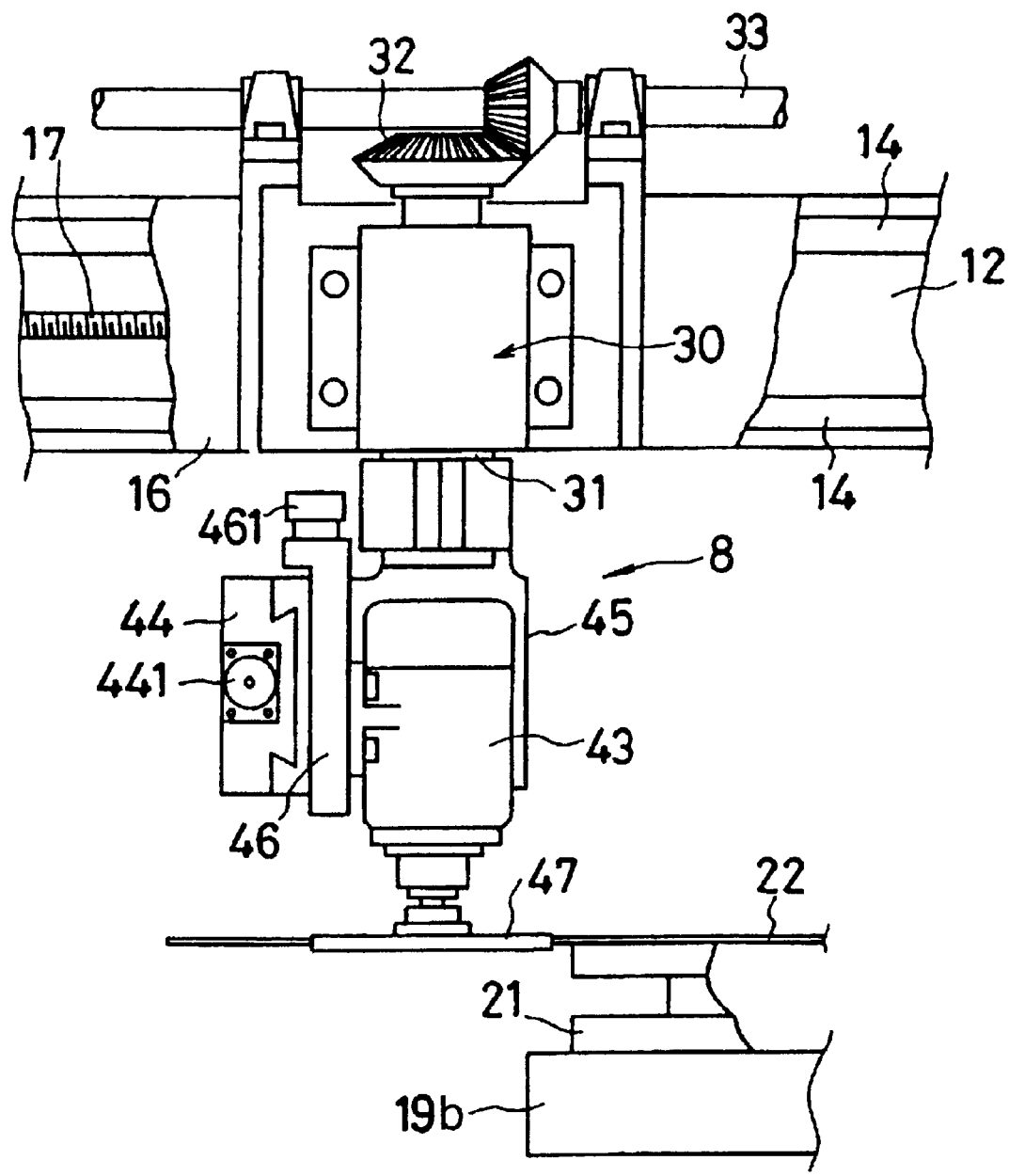
FIG. 9 is a front view of a grinding head of the working machine of FIG. 1.
Figure 10:
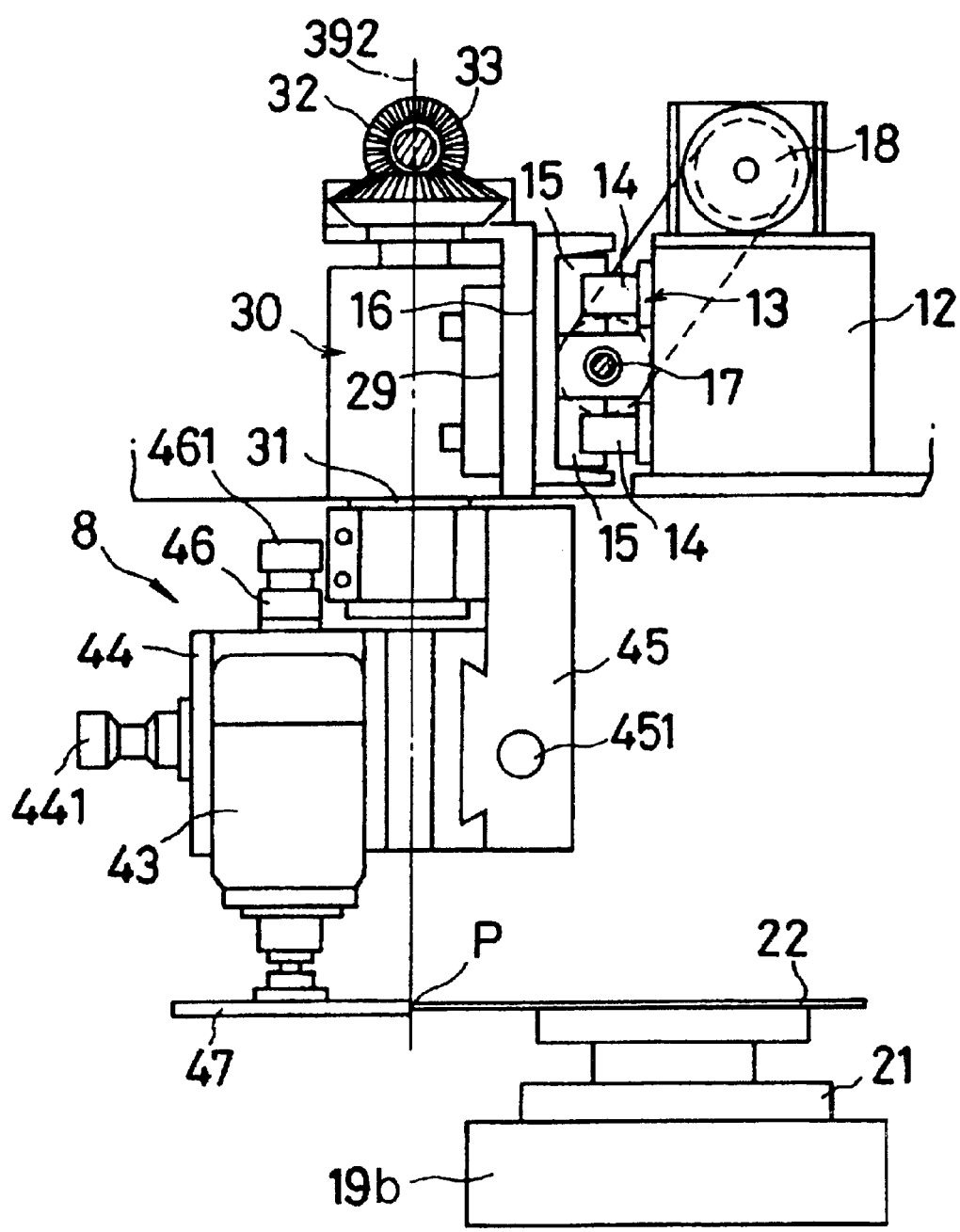
FIG. 10 is a side view of a grinding head of the working machine of FIG. 1.

As shown in FIGS. 9 and 10, grinding head 8 includes spindle motor 43, cutting adjustment slide 44 and cross slide 45 for adjusting the installing position of the spindle motor 43 in two orthogonal horizontal directions, respectively, and vertical slide 46 for adjusting the vertical position of grinding wheel 47, grinding wheel 47 being attached to the shaft of spindle motor 43.

Cutting adjustment slide 44 is moved adjustably in a predetermined direction by turning screw 441. Cross slide 45 is adjustably moved in another direction orthogonal to the former direction by turning screw 451. Vertical slide 46 is adjustably moved in a direction orthogonal to both of the aforementioned directions by turning screw 461. An upper portion of cross slide 45 is attached to shaft 31 of bearing unit 30 and the entire grinding head 8 is suspended by shaft 31.

Grinding head 8 is attached such that the peripheral grinding surface of grinding wheel 47 coincides with the axis 392 of shaft 31 by adjusting cutting adjustment slide 44 and cross slide 45, namely, by turning screw 441 and screw 451, respectively.

As just described above, when a grinding or polishing point P on the periphery of grinding wheel 47 coincides with axis 392 of shaft 31, a grinding point P on the periphery of grinding wheel 47 draws a locus of movement coinciding substantially with cutter wheel 35 of cutting head 7.

In grinding head 8, cutting adjustment slide 44 is moved by screw 441 such that grinding point P on the periphery of grinding wheel 47 is ahead of the axis of shaft 31, and that the locus of movement of the point P is slightly reduced compared to the locus of movement of cutter wheel 35 to give a quantity of cutting to thereby adjust the ground finished size.

Of course, grinding wheel 47 also is angularly controlled by control over the rotation of shaft 31 such that the line connecting the grinding point P on the periphery of grinding wheel 47 with the rotational center of grinding wheel 47 moves maintaining at all times at a constant angle to the edge line of the glass plate.

Glass plate conveyer unit 4 is provided above work table 19 along cutting table 20 and grinding sucker 21. Glass plate conveyer unit 4 has feed shaft mounts 50 on the side frame bases 11 of base mount 10 and extending parallel to mount 12 and movable in the X axis direction. A movable base 52 is provided through slide 53 on parallel guide rails 51 provided on the underside of feed shaft mount 50 so as to be moved or guided parallel to the X axis direction. The movement of movable base 52 of glass plate conveyer unit 4 is made by feed screw 90 provided between the pair of guide rails 51, and feed shaft drive motor 92 connected through transmission means 91 such as a toothed belt to feed screw 90. Feed shaft drive motor 92 is controlled on the basis of numerical information from the numerical control unit CNT. Therefore, as will be described later, the conveyance or transfer of a glass plate by glass plate conveyer unit 4 is accurately made by numerical control.

Figure 4:
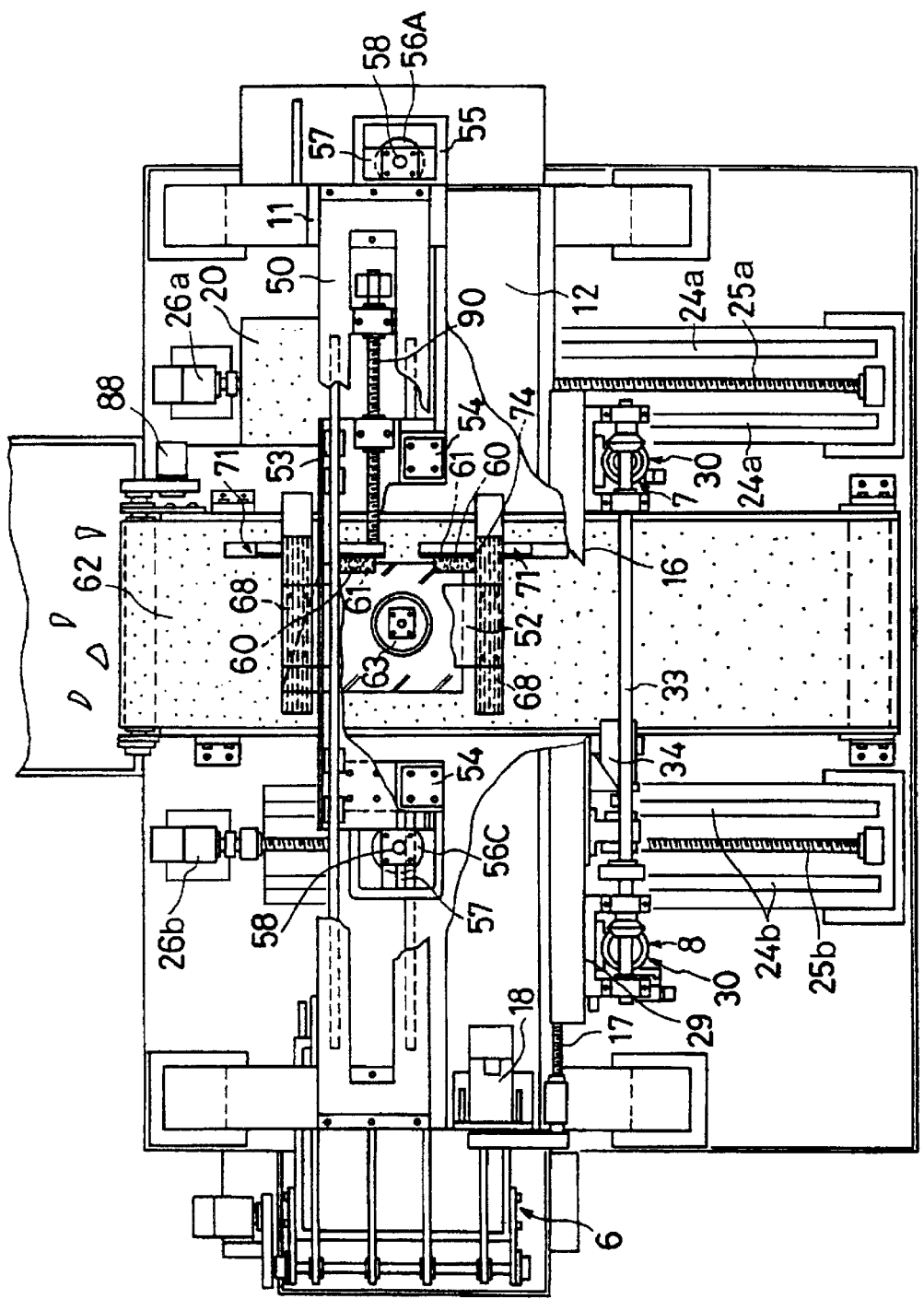
FIG. 4 is a plan view of a glass plate conveyer of the working machine of FIG. 1.
Figure 5:
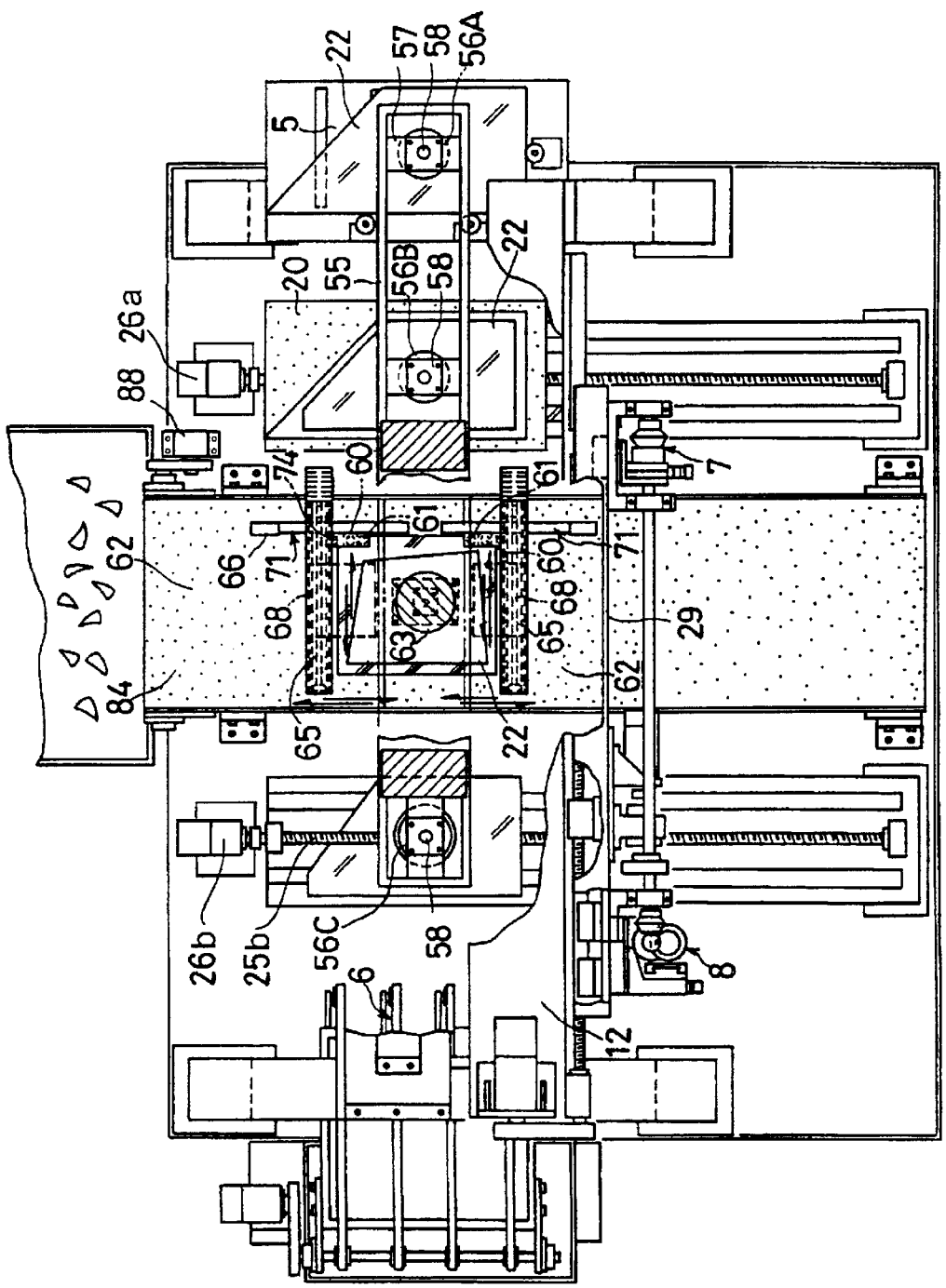
FIG. 5 is a plan view of a breaking unit of the working machine of FIG. 1.
Figure 6:
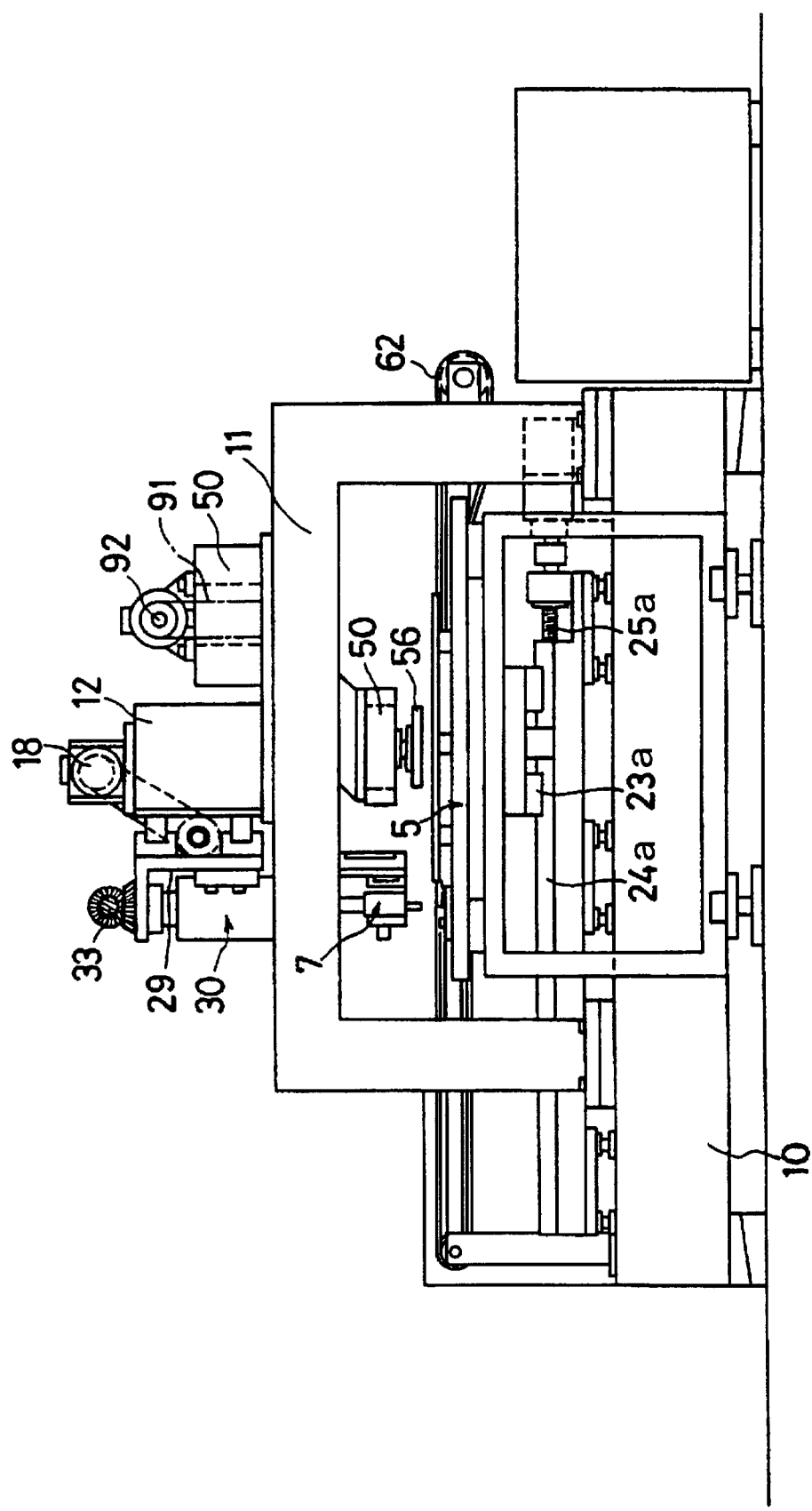
FIG. 6 is a side view and a cross-sectional view of the working machine of FIG. 1.
Figure 7:
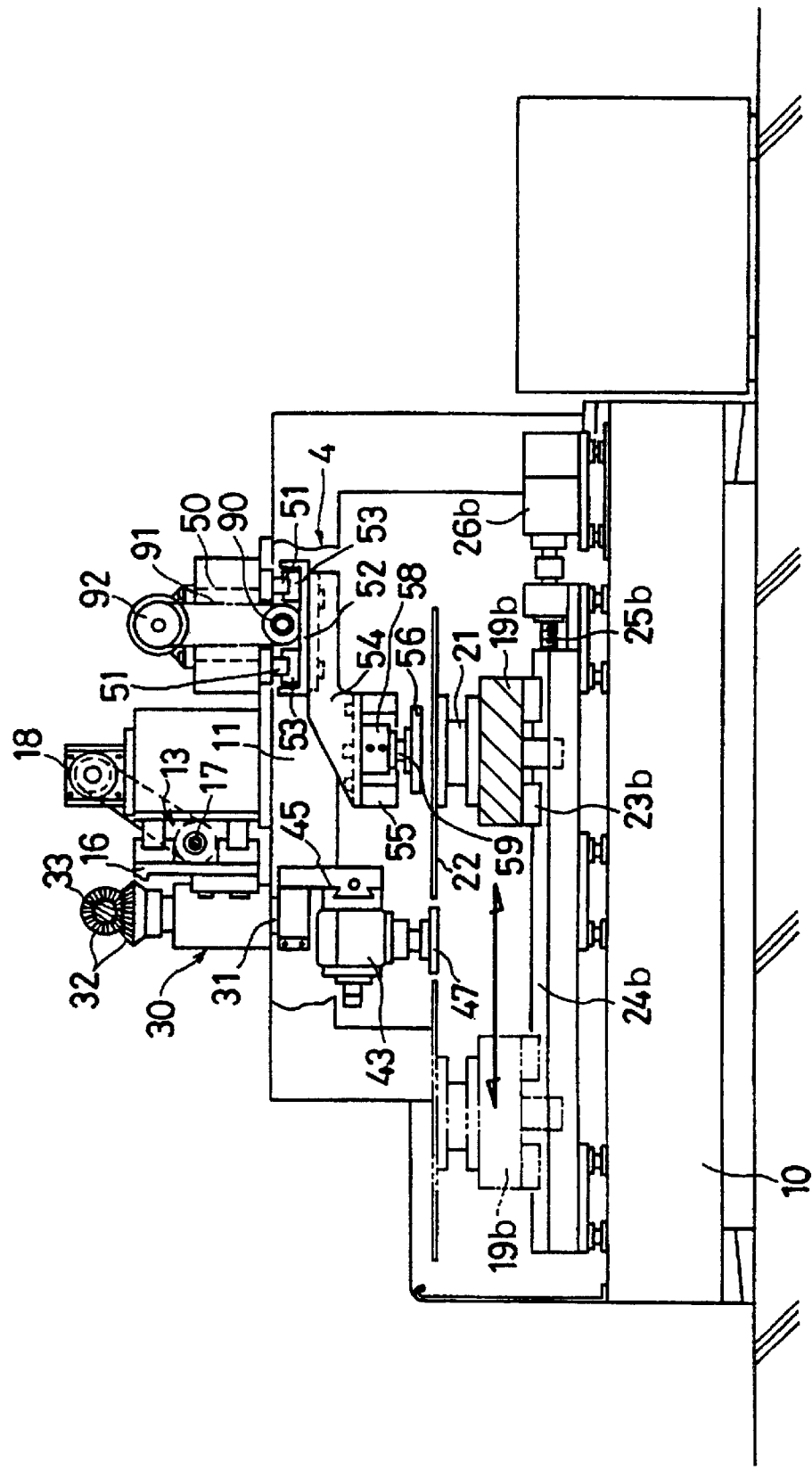
FIG. 7 is a side view and a cross-sectional view of the working machine of FIG. 1.
Figure 8:
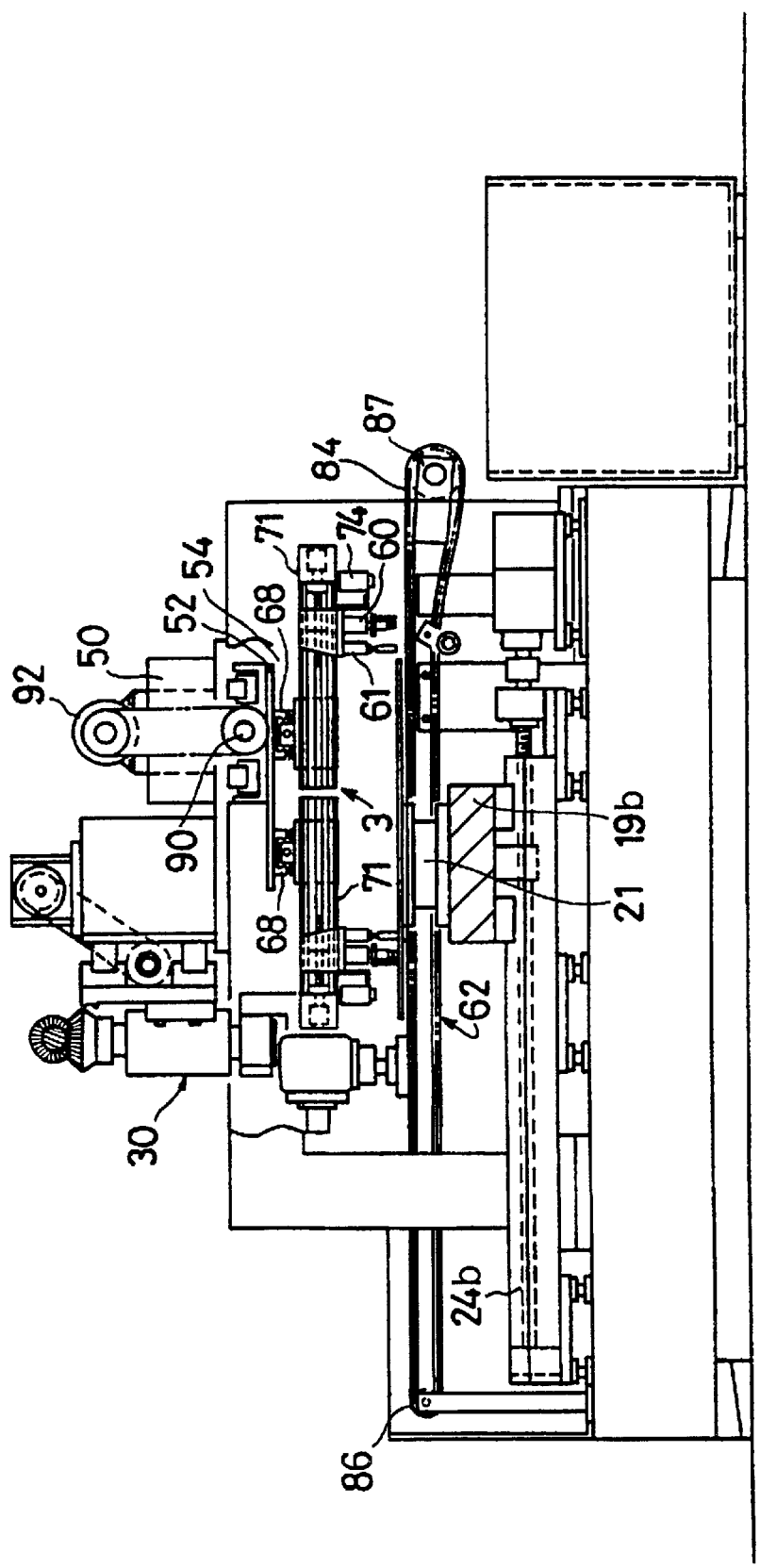
FIG. 8 is a side view and a cross-sectional view of the working machine of FIG. 1.

A movable frame 55 is provided through brackets 54 at the underside of movable base 52. Movable frame 55 is provided so as to extend through cutting unit 1 and grinding unit 2 and has sucker pads 56 (56A, 56B and 56C) at the respective positions of the each working stage, namely, corresponding to those of heads 7 and 8. Namely, sucker pads 56 are located above insertion table 5, cutting table 20 and grinding suckers 21. As shown in FIGS. 4 and 5, sucker pads 56 are attached to corresponding air cylinders 58 attached to movable frame 55, namely, movable base 52 through brackets 57.

Sucker pads 56 are attached to piston rods 59 of air cylinders 58, which are arranged such that by extension of piston rods 59, sucker pads 56 are caused to suck an appropriate glass plate 22 so as to lift glass plate 22 when piston rods 59 is moved upwards.

Glass plate conveyer unit 49 moves movable frame 55 in the X direction to move the glass plate 22 to next working stage under the state in which glass plate 22 is lifted. After this movement, sucker pads 56 are again lowered by air cylinders 58 and then suction force which sucks glass plate 22 is released such that glass plate 22 is transferred to that working stage.

Each air cylinder 58 has a rotation stopping mechanism which stops the rotation of its sucker pad 56 when it is moved vertically.

Breaking unit 3 disposed between cutting unit 1 and grinding unit 2 is arranged to break glass plate 22 on which a cutting line is formed along its cutting line in cutting unit 1. Especially shown in detail in FIGS. 13–16, breaking unit 3 includes end cutter 60 which forms an auxiliary cutting line, which facilitate breakage, outside the cutting line formed by cutting unit 1, press unit 61 which breaks off that portion of the glass plate outside the cutting line, breaking conveyer 62 on which the glass plate 22 to be broken is put and by which the broken glass cullet is conveyed away, and vertically movable sucker 63 for pressing the glass plate 22 against breaking conveyer 62 during the time when end cutter 60 and press unit 61 are operating, lifting the glass plate 22 after breakage and feeding the glass plate 22 to the next grinding unit 2.

The glass plate working machine of the present embodiment is arranged such that the positions of end cutter 60 and press unit 61 are controlled in the orthogonal X-Y plane coordinate system by a previously stored numerical control program so as to be stopped sequentially at required positions for auxiliary cutting or pressing.

Figure 13:
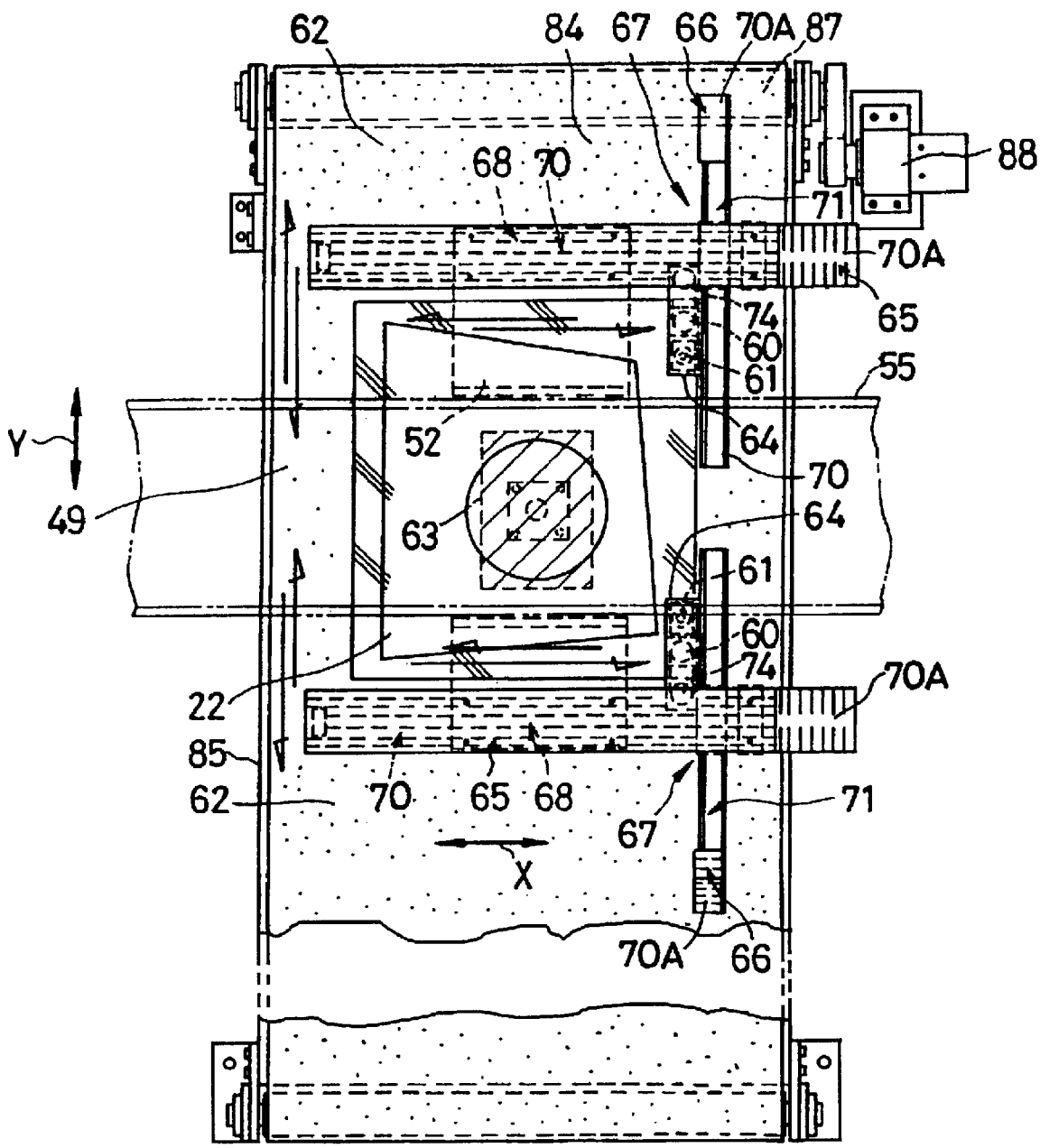
FIG. 13 is an enlarged plan view of the breaking unit of the working machine of FIG. 1.

End cutter 60 and press unit 61 are provided through a common bracket 64 on a slide assembly 67 including an assembly of an X axis direction guide and drive means 65 and a Y axis direction guide and drive means 66 arranged in orthogonal relationship. As shown in FIG. 13, the X axis direction guide and drive means 65 includes X axis linear slide 68 provided on the underside of movable base 52 of glass plate conveyer unit 4 so as to be parallel to the direction in which glass plate conveyer unit 4 moves while the Y axis direction guide and drive means 66 includes Y axis linear slide 71 attached through a bracket to slide 69 of X axis linear slide 68 so as to be orthogonal to slide 69.

X axis linear slide 68 and Y axis linear slide 71 each mainly include a guided drive 70 and servo motor 70A. Slide 69 and slide 69A are fed stepwise by a servo motor, and the like, for example under control of a controller. Of course, X axis linear slide 68 and Y axis linear slide 71 are connected to the numerical control device CNT which has the functions of writing into and reading from a memory, receiving teaching data, transmitting data and includes a CPU, etc.

Figure 14:
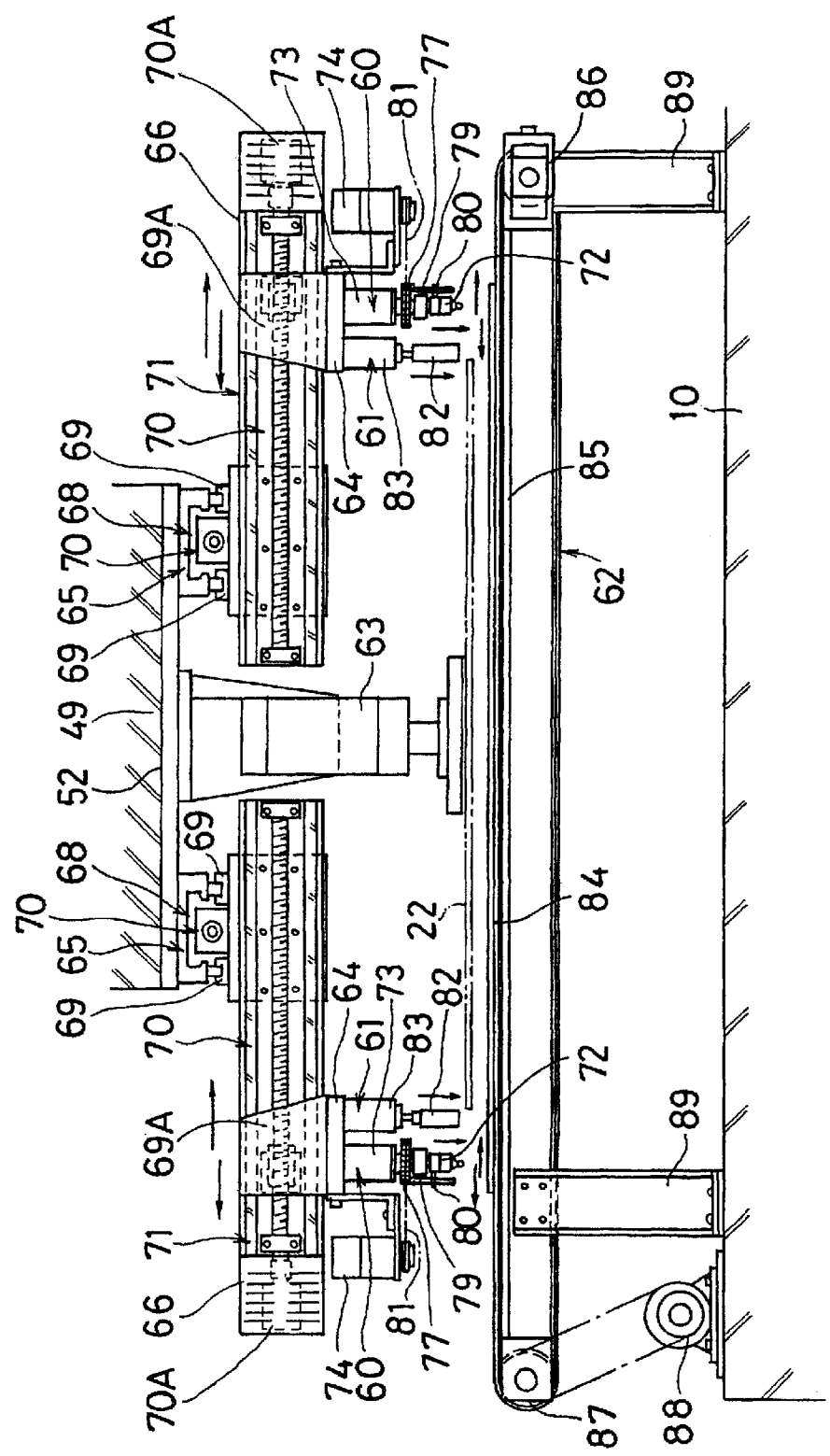
FIG. 14 is an enlarged side view of the breaking unit of the working machine of FIG. 1.
Figure 15:
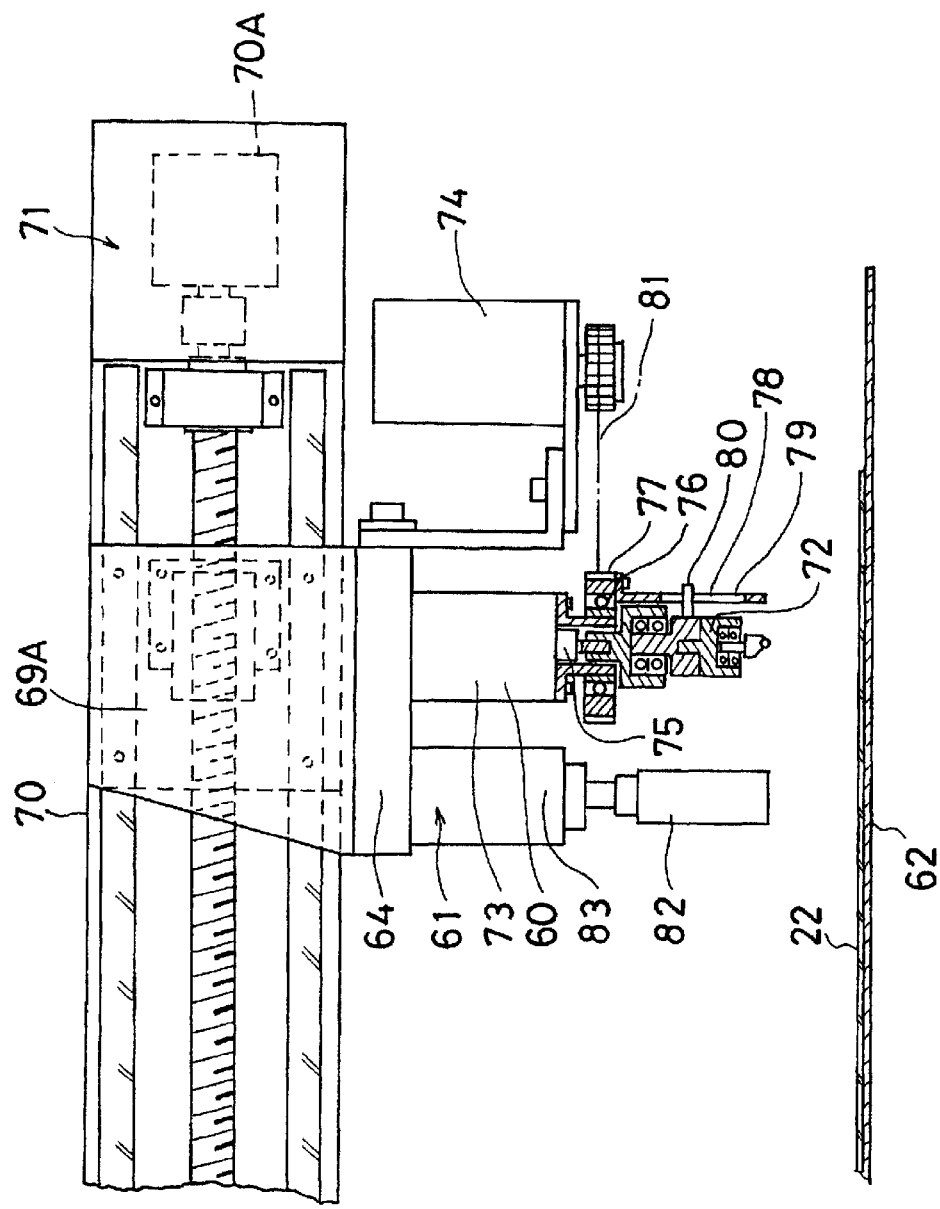
FIG. 15 is a partial cross-sectional view of the essential portion of the breaking unit of FIG. 14.
Figure 16:
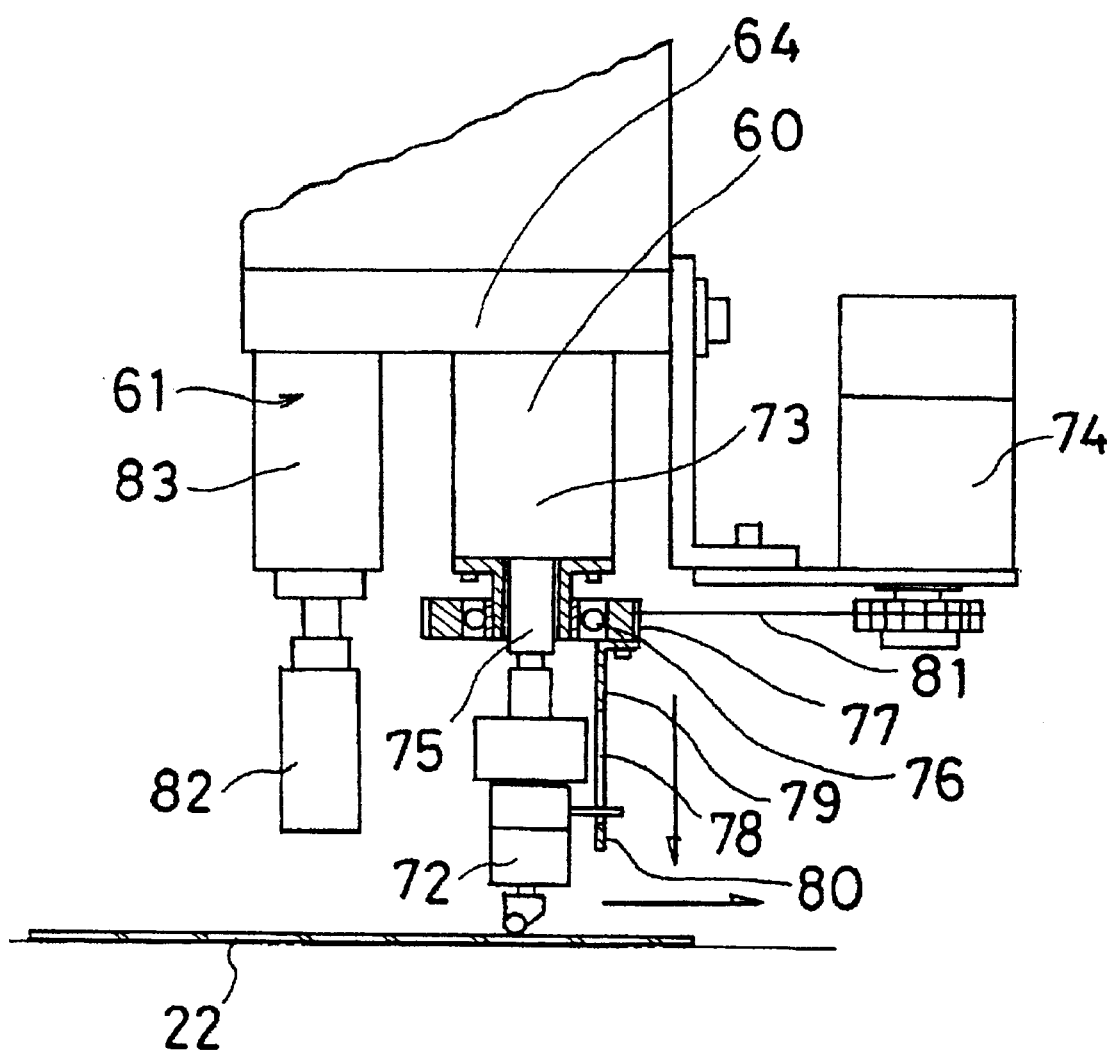
FIG. 16 illustrates the operation of an end cutter of FIG. 14.

As shown in FIGS. 14–16, end cutter 60 mainly includes cutter block 72 to which a head member having a cutter wheel is rotatably attached so as to be parallel to the surface of the glass plate, air cylinder 73 which moves cutter block 72 vertically toward and away from glass plate 22 and angle control motor 74 which directs cutter block 72 in an auxiliary cutting direction, namely, in an end cutting direction. Cutter block 72 is attached to piston rod 75 of air cylinder 73.

Timing pulley 77 is attached through bearing 76 concentrically with piston rod 75 to the underside of air cylinder 73 which presses the cutter wheel against glass plate 22. Protrusion 79 with slot 78 extends from the underside of timing pulley 77. By turning of protrusion 79 attached to timing pulley 77, protrusion 79 is engaged with engaging member 80 to thereby change the direction of cutter block 72 and hence to case the cutter wheel to align with the auxiliary cutting direction. Of course, timing pulley 77 can be driven through belt 81 by angle control motor 74 attached to the common bracket 64.

Press unit 61 which includes air cylinder 83 and push rod 82 attached to the piston rod of air cylinder 83 is attached to bracket 64 through air cylinder 83. Press unit 61 breaks glass plate 22 along its end cutting line by pushing push rod 82 against that portion of glass plate 22 outside the auxiliary cutting line on glass plate 22 under. the actuation of air cylinder 83.

As shown in FIGS. 13 and 14, a pair of cutter 60 and press unit 61 which is in charge of breaking the glass plate is provided on each of the left and right sides of central vertically movable sucker 63 which conveys the glass plate so as to be in charge of the corresponding one of the right and left ranges. A slide assembly 67 which includes an orthogonal assembly structure of a pair of X axis linear slide 68 and Y axis linear slide 71 is provided on each of the right and left sides of vertically movable sucker 63. Each slide assembly 67 includes corresponding end cutter 60 and press unit 61 attached thereto. The slide assemblies 67 are controlled mutually independently in order to reduce a breaking cycle time.

The operation of above mentioned breaking unit 3 will be described next. When glass plate 22 with a cutting line formed thereon by cutting unit 1 has returned to above breaking conveyer 62 by sucker pad 56 of cutting unit 1 and glass plate conveyer unit 4, vertically movable sucker 63 lowers and pushes glass plate 22 against breaking conveyer 62 so as not to move easily. Under such conditions, the right and left pairs of end cutters 60 and press units 61 are sequentially moved to the required positions by the control device CNT based on data previously inputted, then stopped there, and required angle control is provided over the cutter wheel to form an auxiliary cutter line, namely, end cutting line. Press unit 61 is operated under the sequential position control in the forward way to provide a breaking press.

When the pressing operation has ended and end cutters 60 and press units 61 have returned to their origins, vertically movable sucker 63 is moved upward to lift the broken glass plate for preparing for delivery to grinding unit 2.

Breaking conveyer 62 of breaking unit 3 extends between cutting table 20 and grinding sucker 21. Breaking conveyer 62 is disposed such that its upper surface is substantially flush with the respective adjacent upper surfaces of cutting table 20 and grinding sucker 21. Breaking conveyer 62 includes conveyer belt 84, support plate and frame 85 for supporting conveyer belt 84 from inside thereof, drums 86 and 87 supported through bearings on each of the ends of support plate and frame 85 to allow conveyer belt 84 to move in a recirculating manner and drive motor 88 attached through a bracket to support plate and frame 85 to drive one drum 87. The breaking conveyer 62 is supported by mount base 10 through bracket 89 on each of the ends of support plate and frame 85.

The upper surface of breaking conveyer 62 is sized so as to support the entire surface of the maximum-sized unshaped glass plate 22 fed to the present glass plate working machine. The cullet produced by breaking the glass plate is discharged out of the present machine by driving conveyer belt 84 and simultaneously, the present machine receives a glass plate to be fed next on its new cleaned belt surface of the conveyer belt 84.

The operation of the glass plate working machine of the present embodiment and the process from the delivery of an unshaped glass plate to its finish of working will be described sequentially.

When the glass plate working machine starts in operation, of course, cutter wheel 35, grinding wheel 47, work tables 19a and 19b and glass plate conveyer unit 4 stand by at their origins, namely, start positions, respectively.

It should be noted that the origin of work tables 19a and 19b is directly below corresponding sucker pad 56 of glass plate conveyer unit 4.

At the start position of work tables 19a and 19b, each corresponding centerline of sucker pads 56 aligning in the direction of progress of glass plate 22 is arranged to coincide with the centerline of work tables 19a and 19b.

The origin of glass plate conveyer unit 4 is a position where transfer frame 55 is near the glass plate feed side, namely, insertion side or when sucker pad 56 and more particularly sucker pad 56A is located above insertion table 5. It is defined when sucker pad 56 is located at a position shown in FIG. 1.

As described above, when each working unit is at the origin, first, an unshaped glass plate 22 is put on insertion table 5 for glass plate 22. A start button of control device CNT of glass plate working machine (not shown) for the working machine is pressed to start up the glass plate working machine. Sucker pad 56A then lowers to suck and lift unshaped glass plate 22.

Transfer base 52 moves under this situation due to the movement of glass plate conveyer unit 4. When sucker pad 56A arrives at a predetermined position on cutting table 20, sucker pad 56A lowers and releases the suction for unshaped glass plate 22 to put the unshaped glass plate 22 on cutting table 20, again rises and returns. Directly thereafter, transfer base 52 starts to move back to the origin at which time cutting head 7, grinding head 8 and work tables 19a and 19b start to move under numerical control and to perform a cutting operation, and, in more detail, a cutting line formation by cutter wheel 35.

When cutting head 7, grinding head 8 and tables 19a and 19b return to their respective origins after the cutting operation has ended, sucker pad 56 again lowers to lift glass plate 22. Thus, by the movement of transfer base 52, the cut glass plate 22 on cutting table 20 is moved onto breaking conveyer 62. A new unshaped glass plate 22 is fed to cutting table 20 from insertion table 5.

When a cutting line is being formed on unshaped glass plate 22 on cutting table 20, at the breaking unit 3, end cutter 60 disposed at the predetermined position forms a cutting line in predetermined position. Sucker pad 56 then lowers, sucks glass plate 22, operates press unit 62 disposed at a predetermined position to break off and remove unnecessary glass portions such as glass ends, while lifting sucker pad 56 and the resulting glass plate 22 having a predetermined outer shape. In this state, termination of the cutting operation by cutting unit 1 is awaited.

After the cutting operation has ended, glass plate 22 on breaking unit 3 is transferred to sucker 21 of grinding unit 2 by the operation of glass plate conveyer unit 4. The next glass plate with a cutting line thereon is fed to the breaking unit 3 and a new unshaped glass plate 22 is fed to cutting table 20.

The broken glass plate 22 transferred to grinding unit 2 is ground concurrently with the next cutting operation. At the breaking unit 3, the breaking operation is performed concurrently with the cutting line forming operation and grinding operation, respectively. Of course, the operation of grinding units 3 is performed in conjunction and concurrently with the operation of cutting unit 1.

Glass plate 22 ground by grinding unit 2 is moved onto take-out conveyer 6 in the next operation cycle of glass plate conveyer unit 4. Glass plate 22 is taken out of the glass plate working machine by the operation of take-out conveyer 6.

As described above, the glass plate working machine of the present embodiment is capable of performing cutting and grinding operations concurrently using the common control device CNT, so that the number of operations is greatly reduced compared to the conventional technique which uses separate units.

The glass plate working machine of the present embodiment is capable of cutting and grind a glass plate on the basis of single numerical data, so that it can easily adjust to changing the kind of material to be worked and is suitable for flexible manufacturing.

While cutting unit 1 and grinding unit 2 are working the glass plate, breaking unit 3 automatically breaks another glass plate simultaneously, so that the breaking operation has a time margin to thereby ensure automatic glass breaking.

In addition, the glass plate working machine of the present embodiment includes cutting unit 1, breaking unit 3, grinding unit 2 and glass conveyer unit 4 extending through cutting unit 1, breaking unit 3 and grinding unit 2, so that this sole machine can automatically perform the operations of supplying unshaped glass plate 22 to take-out ground glass plate 22 in a continuous manner without requiring manual operations.

The glass plate working machine of this embodiment is very compact, reduces the space and requires no large-scaled system for controlling the respective units in a systematic manner compared to the conventional large-scaled line glass plate working machine which includes separate units which are sequentially connected through a conveyer. Moreover, the present machine is convenient for changing the kind of products and suitable for flexible manufacturing.

Further, while the glass plate working machine according to the present invention is suitable for forming a window glass for an automobile, it is not necessarily limited to it in use.

With the present invention, it is possible to provide a glass plate working machine which can move a table of cutting unit on which an unshaped glass plate is placed and a table of grinding unit on which a broken glass plate is placed accurately synchronously.

And also, with the present invention, it is possible to provide a glass plate working machine which can move a cutting head of a cutting unit for forming a cutting line on an unshaped glass plate and a grinding head of a grinding unit for grinding an edge of a broken glass plate accurately synchronously.

What is claimed is:

1. A glass plate working machine comprising: a cutting unit for forming a cutting line on an unshaped glass plate to break the unshaped glass plate; a grinding unit for grinding an edge of the glass plate broken along the cutting line; a glass plate conveyer unit for conveying the glass plate sequentially through the cutting unit and the grinding unit; and control means connected to the cutting unit and the grinding unit for controlling the cutting unit and the grinding unit, respectively, the cutting unit including a table of the cutting unit on which the unshaped glass plate is placed, and an electric motor for moving the table of the cutting unit in one direction, the grinding unit including a table of the grinding unit on which the broken glass plate is placed, and an electric motor disposed separately from the electric motor of the cutting unit, for moving the table of the cutting unit in one direction for moving the table of the grinding unit in one direction, the electric motor of the cutting unit and the electric motor of the grinding unit being adapted to be operated synchronously by the control means to move the table of the cutting unit and the table of the grinding unit concurrently in one direction.

2. A glass plate working machine according to claim 1, wherein the table of the cutting unit and the table of the grinding unit are connected to each other through an intermediate connecting plate.

3. A glass plate working machine according to claim 1, comprising a breaking unit provided between the cutting unit and the grinding unit for breaking the unshaped glass plate along the cutting line, the control means being connected to the breaking unit such that while the cutting unit and the grinding unit are in motion, the breaking unit performs an operation concurrently.

4. A glass plate working machine according to claim 1, comprising a breaking unit provided between the cutting unit and the grinding unit for breaking the unshaped glass plate along the cutting line, the control means being connected to the breaking unit such that while the cutting unit and the grinding unit are in motion, the breaking unit performs an operation concurrently, the table of the cutting unit and the table of the grinding unit being connected to each other through an intermediate connecting plate disposed across the breaking unit.

5. A glass plate working machine according to claim 1, wherein the cutting unit includes a cutting head for forming the cutting line on the unshaped glass plate, the grinding unit includes a grinding head for grinding the edge of the broken glass plate, the cutting head and the grinding head are adapted to be moved concurrently in another direction perpendicular to one direction, the control means controlling the concurrent movement of the cutting head and the grinding head.

6. A glass plate working machine according to claim 1, wherein the cutting unit includes a cutting head for forming the cutting line on the unshaped glass plate, and an electric motor for moving the cutting head in another direction perpendicular to one direction, the grinding unit including a grinding head for grinding the edge of the broken glass plate, and an electric motor disposed separately from the electric motor of the cutting unit for moving the cutting head in another direction for moving the grinding head in another direction, the electric motor of the cutting unit for moving the cutting head in another direction and the electric motor of the grinding unit for moving the grinding head in another direction being adapted to be operated synchronously by the control means to move the cutting head and the grinding head concurrently in another direction.

7. A glass plate working machine comprising: a cutting unit for forming a cutting line on an unshaped glass plate to break the unshaped glass plate; a grinding unit for grinding an edge of the glass plate broken along the cutting line; a glass plate conveyer unit for conveying the glass plate sequentially through the cutting unit and the grinding unit; and control means connected to the cutting unit and the grinding unit for controlling the cutting unit and the grinding unit, respectively, the cutting unit including a cutting head for forming the cutting line on the unshaped glass plate, and an electric motor for moving the cutting head in one direction, the grinding unit including a grinding head for grinding the edge of the broken glass plate, and an electric motor disposed separately from the electric motor of the cutting unit for moving the cutting head in one direction, for moving the grinding head in one direction, the electric motor of the cutting unit for moving the cutting head in one direction and the electric motor of the grinding unit for moving the grinding head in one direction being adapted to be operated synchronously by the control means to move the cutting head and the grinding head concurrently in one direction.

* * * * *

UNITED STATES PATENT AND TRADEMARK OFFICE
CERTIFICATE OF CORRECTION

PATENT NO.   : 6,461,223 B1
DATED        : October 8, 2002
INVENTOR(S)  : Bando

It is certified that error appears in the above-identified patent and that said Letters Patent is hereby corrected as shown below:

<u>Title page, Item [54] and Column 1, line 1,</u>
Delete "SHEET GLASS WORKING MACHINE" and insert
-- MACHINE FOR WORKING A GLASS PLATE --.

Signed and Sealed this

Seventh Day of January, 2003

JAMES E. ROGAN
*Director of the United States Patent and Trademark Office*